(12) United States Patent
Renner et al.

(10) Patent No.: US 9,453,573 B2
(45) Date of Patent: Sep. 27, 2016

(54) CONTINUOUSLY VARIABLE TRANSMISSION ASSEMBLY FOR A VEHICLE

(71) Applicant: BRP-POWERTRAIN GMBH & CO. KG, Gunskirchen (AT)

(72) Inventors: Marc Renner, Alkoven (AT); Thomas Gaertner, Gunskirchen (AT); Gerhard Wiesinger, Lenzing (AT)

(73) Assignee: BRP-POWERTRAIN GMBH & CO. KG, Gunskirchen (AT)

(*) Notice: Subject to any disclaimer, the term of this patent is extended or adjusted under 35 U.S.C. 154(b) by 42 days.

(21) Appl. No.: 14/319,034

(22) Filed: Jun. 30, 2014

(65) Prior Publication Data

US 2015/0377341 A1    Dec. 31, 2015

(51) Int. Cl.
*F16H 57/04* (2010.01)
*F16H 9/12* (2006.01)
*F16H 57/027* (2012.01)

(52) U.S. Cl.
CPC ............ *F16H 57/0489* (2013.01); *F16H 9/12* (2013.01); *F16H 57/027* (2013.01); *F16H 57/0416* (2013.01)

(58) Field of Classification Search
CPC .......... F16H 57/0489; F16H 57/0415; F16H 57/05; F16H 57/0416; F16H 61/02
USPC .......................................................... 474/93
See application file for complete search history.

(56) References Cited

U.S. PATENT DOCUMENTS 2,145,545 A * 1/1939 Johnson .................... F16H 9/16
474/29
2,315,317 A * 3/1943 Copp .................... F16H 57/027
415/90

(Continued)

FOREIGN PATENT DOCUMENTS

EP    1553331 A1    7/2005

*Primary Examiner* — Henry Liu
(74) *Attorney, Agent, or Firm* — BCF LLP

(57) ABSTRACT

A continuously variable transmission assembly includes a driving pulley rotatable about a driving pulley axis and a driven pulley rotatable about a driven pulley axis. An endless belt operatively connecting the pulleys defines a belt reference plane, the driving and driven pulley axes passing therethrough. A housing encloses a space, the driving pulley, the driven pulley, and the belt being disposed at least in part therein. A driven pulley inlet and outlet defined in the housing are disposed closer to the driven pulley than the driving pulley. The driven pulley inlet, disposed on a first side of the belt reference plane, is configured to direct air from outside the housing into the space toward the driven pulley. The driven pulley outlet is disposed on a second side of the belt reference plane. Air flows from the space to the outside of the housing via the driven pulley outlet.

20 Claims, 14 Drawing Sheets

(56) References Cited

U.S. PATENT DOCUMENTS

| | | | | |
|---|---|---|---|---|
| 3,467,177 A * | 9/1969 | Hoddinott | ............ | F16H 57/0415 165/122 |
| 4,422,498 A * | 12/1983 | Chen | .................... | B23Q 11/127 165/47 |
| 4,531,928 A * | 7/1985 | Ikenoya | ................... | B62M 9/06 180/229 |
| 4,596,537 A * | 6/1986 | Te-Long | ................... | F16H 9/12 474/93 |
| 4,631,977 A * | 12/1986 | Kawashima | ............. | B62M 9/06 474/150 |
| 4,645,028 A * | 2/1987 | Kawashima | ......... | B62K 25/283 180/227 |
| 4,671,782 A * | 6/1987 | Ochiai | .................... | B62M 7/06 474/93 |
| 4,708,699 A * | 11/1987 | Takano | ................... | F02B 77/13 474/144 |
| 5,976,044 A * | 11/1999 | Kuyama | ................. | F02B 61/02 474/146 |
| 6,176,796 B1 | 1/2001 | Lislegard | | |
| 6,267,700 B1 * | 7/2001 | Takayama | ............... | F02B 61/02 474/144 |
| 6,338,688 B1 * | 1/2002 | Minami | ................ | F16H 57/029 474/144 |
| 6,705,417 B2 * | 3/2004 | Kitai | ...................... | B60K 11/06 123/41.62 |
| 6,938,508 B1 | 9/2005 | Saagge | | |
| 6,938,676 B2 * | 9/2005 | Lan | ..................... | F16H 57/0489 165/41 |
| 7,427,248 B2 * | 9/2008 | Chonan | ................... | F16H 57/05 474/150 |
| 7,562,739 B2 | 7/2009 | Lan et al. | | |
| 7,686,123 B2 * | 3/2010 | Ishida | .................... | B62K 11/04 180/219 |
| 7,882,911 B2 * | 2/2011 | Nobuhira | ................. | B62M 7/02 180/229 |
| 8,157,039 B2 | 4/2012 | Melvin et al. | | |
| 2004/0224806 A1 * | 11/2004 | Chonan | ............... | F16H 57/0415 474/93 |
| 2006/0270503 A1 * | 11/2006 | Suzuki | ............... | F16H 57/0489 474/144 |
| 2007/0023220 A1 * | 2/2007 | Ishida | ................ | F16H 57/0489 180/229 |
| 2007/0215404 A1 * | 9/2007 | Lan | ......................... | B62K 5/01 180/339 |
| 2008/0210484 A1 * | 9/2008 | Ishida | ................... | B62K 11/04 180/366 |
| 2012/0289370 A1 * | 11/2012 | Yamanishi | ............. | B60K 11/08 474/93 |
| 2013/0090198 A1 * | 4/2013 | Itoo | ........................ | F16H 57/03 474/93 |
| 2013/0090199 A1 * | 4/2013 | Itoo | ..................... | F16H 57/0416 474/93 |

\* cited by examiner

CONTINUOUSLY VARIABLE TRANSMISSION ASSEMBLY FOR A VEHICLE

FIELD OF TECHNOLOGY

The present technology relates generally to continuously variable transmissions, and more specifically to continuously variable transmission assemblies.

BACKGROUND

Continuously variable transmissions (CVTs) are used in many kinds of wheeled and tracked vehicles to transfer power from the engine to the wheels or tracks of the vehicle. A CVT has a driving pulley and a driven pulley connected by an endless belt. Each pulley has a pair of opposing sheaves, at least one of which is axially moveable, holding the belt between them. The opposing pulley sheaves exert a clamping force on the belt to keep the belt engaged so that the rotational motion of the driving pulley can be transmitted to the driven pulley. The diameters of the driving pulley and the driven pulley are in inverse relationship due to the relatively fixed length of the belt spanning the two pulleys. The belt moves up and down the opposing pulley sheaves as the diameter of the pulley changes. This clamping force exerted on the belt by the opposing pulley sheaves and the motion of the belt against the surface of the sheaves generates a significant amount of heat. The amount of heat generated can be a problem in vehicles used on rugged terrains or those carrying large amounts of load, such as all-terrain vehicles and the like, which encounter frequent changes of speed and/or output torque required to negotiate the rough terrain.

There is thus a need for a CVT assembly which provides adequate cooling to prevent wear and damage, especially to the belt, due to excessive heat.

SUMMARY

It is an object of the present technology to ameliorate at least some of the inconveniences present in the prior art.

In one aspect, a continuously variable transmission (CVT) assembly includes a driving pulley rotatable about a driving pulley axis and a driven pulley rotatable about a driven pulley axis disposed parallel to the driving pulley axis. An endless belt operatively connects the driving pulley with the driven pulley. The belt defines a belt reference plane. The driving pulley axis and the driven pulley axis pass through the belt reference plane. A housing encloses a space. The driving pulley, the driven pulley, and the belt are disposed at least in part in the space. A driven pulley inlet defined in the housing and disposed on a first side of the belt reference is disposed closer to the driven pulley than to the driving pulley. The driven pulley inlet is configured to direct air from outside the housing into the space toward the driven pulley. A driven pulley outlet defined in the housing and disposed on a second side of the belt reference plane is disposed closer to the driven pulley than the driving pulley. Air flows from the space to the outside of the housing via the driven pulley outlet.

In another aspect, the driven pulley axis passes through the driven pulley inlet.

In another aspect, the driven pulley inlet is configured to direct air into the space in an axial direction with respect to the driven pulley.

In yet another aspect, the driven pulley outlet is disposed radially outwardly of the driven pulley axis.

In a further aspect, at least a portion of the driven pulley outlet is disposed radially outwardly of the driven pulley.

In another aspect, the driven pulley outlet is configured to direct air flowing therethrough in a direction generally perpendicular to the driven pulley.

In an additional aspect, the driven pulley includes an outer surface disposed on the first side of the belt reference plane and facing away from the belt, the outer surface of the driven pulley comprising fins, rotation of the driven pulley causing air from outside the space to be drawn into the space via the driven pulley inlet.

In an additional aspect, a driving pulley inlet is defined in the housing and disposed closer to the driving pulley than the driven pulley. The driving pulley inlet is configured to direct air from outside the housing into the space and toward the driving pulley.

In another aspect, the driving pulley inlet is disposed at least is part on the second side of the belt reference plane.

In an additional aspect, the driving pulley includes an outer surface disposed on the second side of the belt reference plane and facing away from the belt. The outer surface of the driving pulley has fins. Rotation of the driving pulley causes air from outside the space to be drawn into the space via the driving pulley inlet.

In another aspect, the driving pulley inlet is configured to direct air into the space in a direction generally perpendicular to the driving pulley axis.

In a further aspect, a driving pulley outlet defined in the housing and disposed closer to the driving pulley than the driven pulley is configured to direct air from the space to outside the housing.

In another aspect, the driving pulley outlet is configured to direct air flowing therethrough in a direction generally perpendicular to the driving pulley axis.

In an additional aspect, the driving pulley inlet is disposed at least in part on one of the first side and the second side of the belt reference plane. The driving pulley outlet is disposed at least in part on an other of the first side and the second side of the belt reference plane.

In another aspect, the driving pulley inlet is configured to direct air into the space and toward the driving pulley in a radial direction with respect to the driving pulley, and the driving pulley outlet is configured to direct air out of the space in the radial direction with respect to the driving pulley.

In another aspect, the housing includes a first cover extending at least in part on the first side of the belt reference plane, the driving pulley and the driven pulley. A second cover extends at least in part on the second side of the belt reference plane, the driving pulley and the driven pulley. The second cover is connected to the first cover to define the space therebetween. One of the driving pulley inlet and the driving pulley outlet is defined in the first cover. An other of the driving pulley inlet and the driving pulley outlet is defined in the second cover.

In a further aspect, one of the driven pulley inlet and the driven pulley outlet is defined in the first cover, and an other of the driven pulley inlet and the driven pulley outlet is defined in the second cover.

In another aspect, the driven pulley inlet and the driving pulley outlet are both defined in one of the first cover and the second cover, and the driven pulley outlet and the driving pulley inlet are both defined in an other of the first cover and the second cover.

In an additional aspect, a first cover extends on the first side of the belt reference plane, the driving pulley and the driven pulley. The driven pulley inlet is defined in the first cover. A second cover extends on the second side of the belt reference plane, the driving pulley and the driven pulley. The second cover is connected to the first cover to define the space therebetween.

In another aspect, the driven pulley outlet is defined in the second cover.

In a further aspect, the driving pulley is mounted on a driving shaft to rotate therewith about the driving pulley axis. The driving shaft extends through an opening in the housing, the opening being disposed on the second side of the belt reference plane.

In yet another aspect, a wall is disposed in the space and connected to the housing. The wall is disposed between driving pulley and the driven pulley and thereby defines a driving pulley space and a driven pulley space. The driving pulley is disposed in the driving pulley space, and the driven pulley is disposed in the driven pulley space.

In a further aspect, a driven pulley inlet duct is connected to the driven pulley inlet, and a driven pulley outlet duct is connected to the driven pulley outlet.

In an additional aspect, a vehicle includes a frame, at least one ground engaging member, which is one of: a ski, a track and a wheel, a motor connected to the at least one ground engaging member. A CVT assembly having at least one of the above aspects operatively connects the motor to the at least one ground engaging member.

For purposes of the present application, terms related to spatial orientation when referring to a vehicle and components in relation to the vehicle, such as "forwardly", "rearwardly", "left", "right", "above" and "below", are as they would be understood by a driver of the vehicle, with the vehicle in a straight ahead orientation (i.e. not steered left or right), and in an upright position (i.e. not tilted).

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Implementations of the present technology will be described with respect to a multi-passenger recreational utility vehicle. However, it is contemplated that aspects of the implementations of the present technology could also be used on other wheeled or tracked vehicles having continuously variable transmissions (CVTs), such as snowmobiles, motorcycles, all-terrain vehicles, and the like.

Figure 1A:
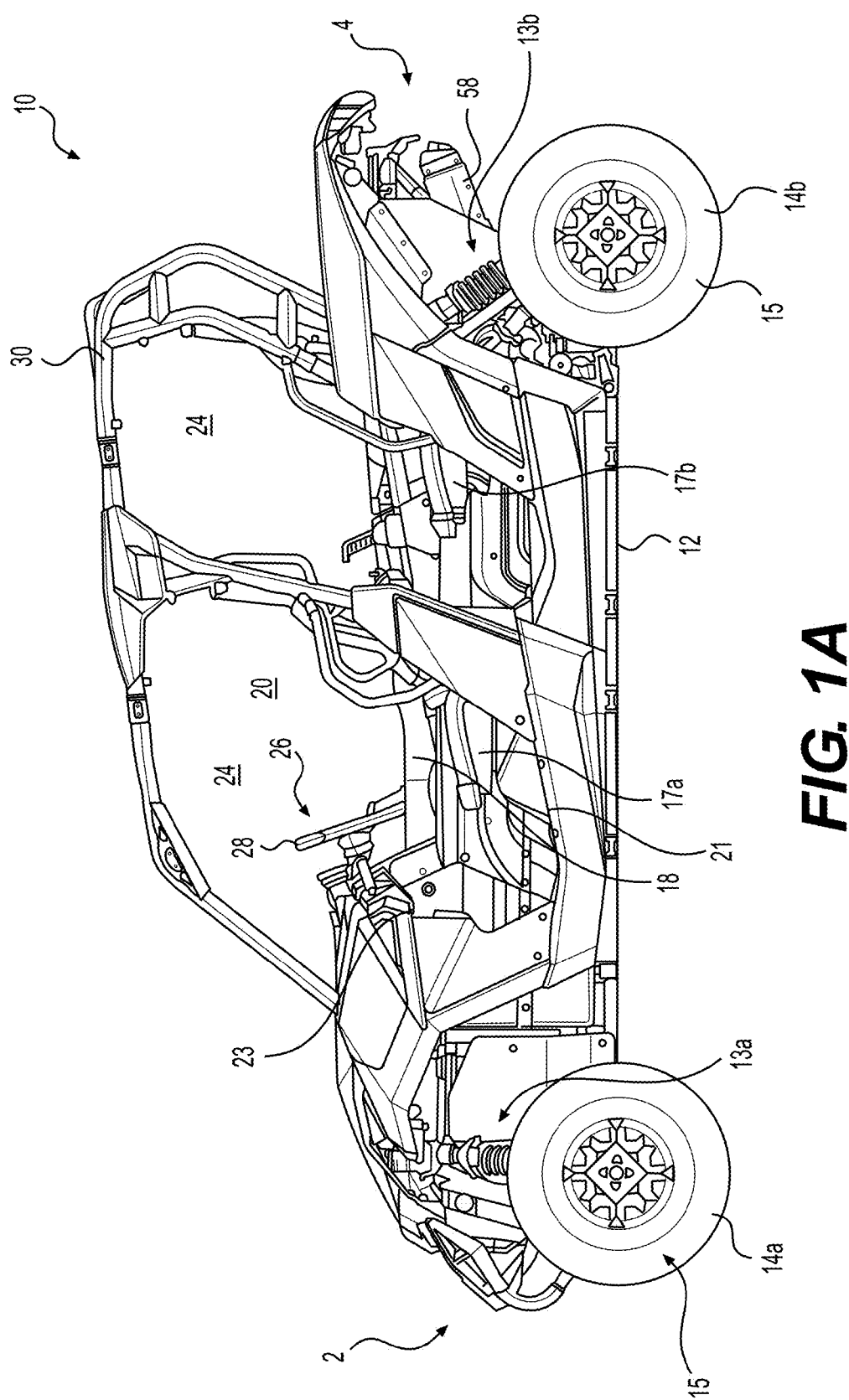
FIG. 1A is a left side elevation view of a multi-passenger recreational utility vehicle.
Figure 1B:
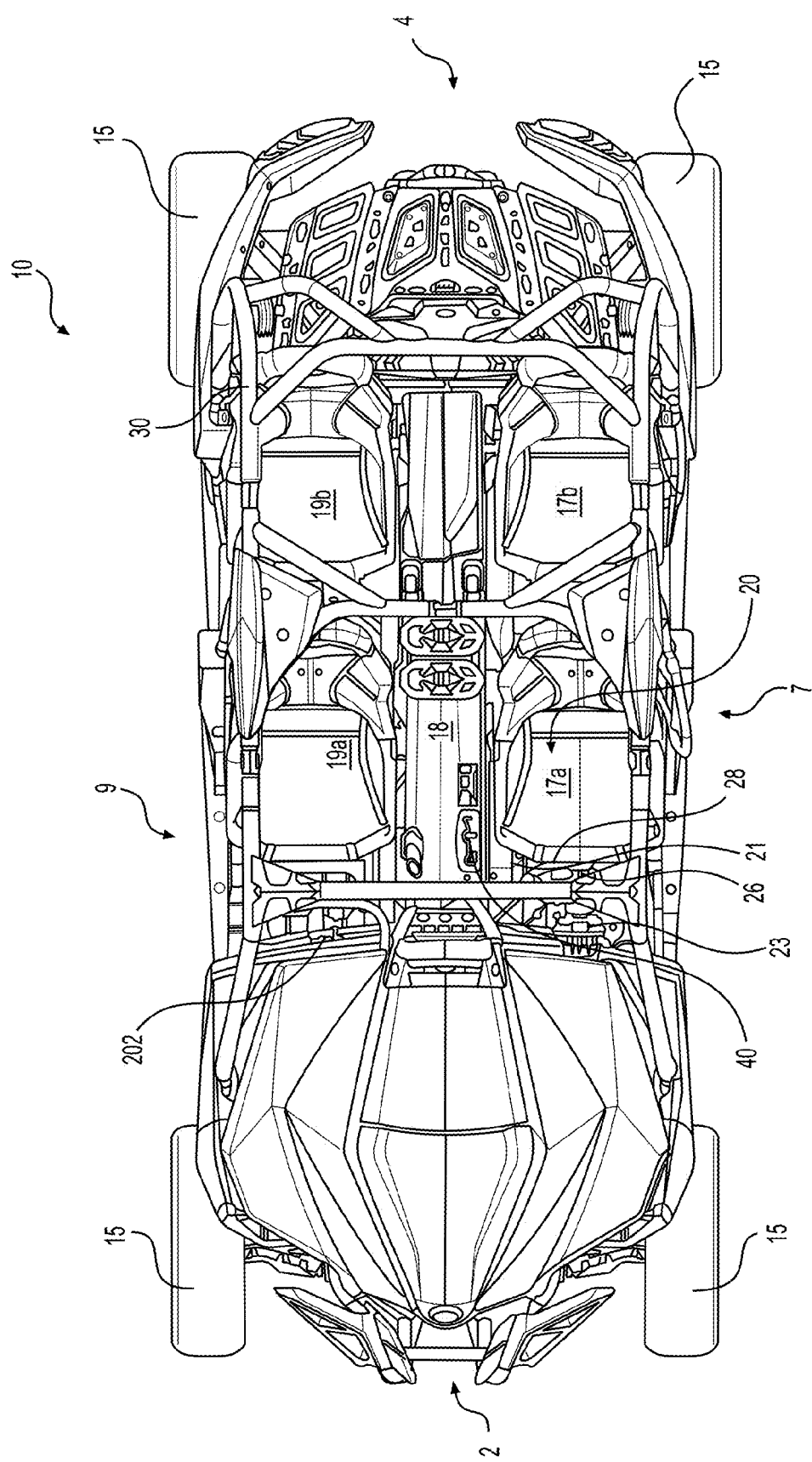
FIG. 1B is a top plan view of the vehicle of FIG. 1A.

FIGS. 1A and 1B illustrate a vehicle 10 having a front end 2, a rear end 4, a left side 7 and a right side 9, consistently defined with the forward travel direction. The vehicle 10 includes a frame 12 to which all other parts of the vehicle 10 are connected, directly or indirectly.

The vehicle 10 includes a pair of front wheels 14A and a pair of rear wheels 14B. Each of the wheels 14A, 14B has a tire 15. Each front wheel 14A is suspended from the front portion 12A of the frame 12 via a front suspension 13A. Each rear wheel 14B is suspended from the rear portion 12B of the frame 12 via a rear suspension 13B. It is also contemplated that the vehicle 10 could have six or more wheels.

The vehicle 10 has an open-air cockpit area 20 disposed generally in the middle portion of the vehicle 10. The cockpit area 20 includes four seats: a front left seat 17A, a front right seat 19A, a rear left seat 17B and a rear right seat 19B to accommodate a driver and three passengers (collectively referred to herein as riders). The front seats 17A, 19A are laterally spaced apart from each another. The rear seats 17B 19B are laterally spaced apart from each other and are longitudinally spaced apart from the front seats 17A, 19A. Each of the seats 17A, 19A, 17B, 19B is a bucket seat. It is contemplated that the vehicle 10 could have only a front left seat 17A and a front right seat 19A. It is also contemplated that a pair of laterally spaced seats, 17A and 19A, 17B and 19B, could be replaced by a bench seat.

The cockpit area 20 has openings 24 on the left and right sides 7, 9 of the vehicle 10 through which the riders can enter and exit the vehicle 10. A lateral cover (not shown) or a door (not shown) could be selectively disposed across each opening 24. The lateral covers would be disposed across the openings 24 when the riders are riding the vehicle 10 and could be opened by the driver and/or passenger when they desire to enter or exit the cockpit area 20.

The cockpit area 20 has a floor 21, and a front wall 23 disposed forward of a steering wheel 28. A dashboard, having a display cluster mounted thereto, is attached to the upper portion of the front wall 23. The display cluster includes a number of screens and dials for the operation of the vehicle, such as a speedometer, odometer, engine speed indicator, fuel gauge, an engine temperature gauge, and the like.

A roll cage 30 is connected to the frame 12 and is disposed above the cockpit area 20. The roll cage 30 is an arrangement of metal tubes, and is connected to the frame 12 in front of the cockpit area 20 and rearward of the cockpit area 20.

A steering assembly 26, including the steering wheel 28, is disposed in front of the driver seat, which in this implementation, is the front left seat 17A. The seats 17B, 19A, 19B are passenger seats. The steering assembly 26 is operatively connected to the two front wheels 14A to permit steering of the vehicle 10. The left side 7 is the driver side, the right side 9 is the passenger side and. It is contemplated that the steering wheel 26 could be disposed in front of the right seat 19A, wherein the right side 9 would be the driver side, the left side 7 would be the passenger side, and the seats 17A, 17B, 19B would be passenger seats. Steering devices other than a steering wheel are also contemplated, such as a steering handle, for example.

Figure 3A:
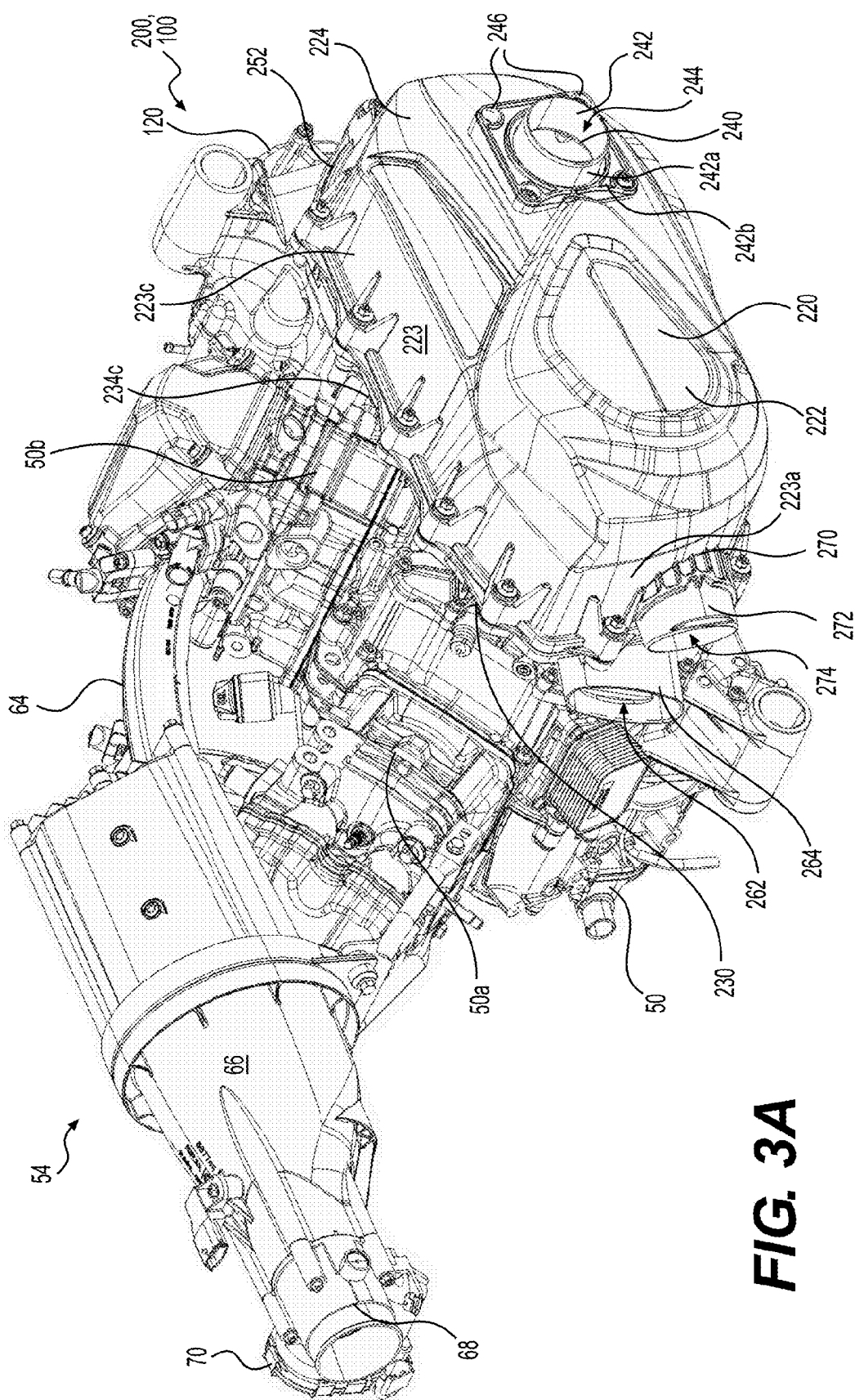
FIG. 3A is a perspective view, taken from a front, left side of a portion of the powerpack of the vehicle, with air ducts of the CVT assembly removed for clarity.
Figure 3B:
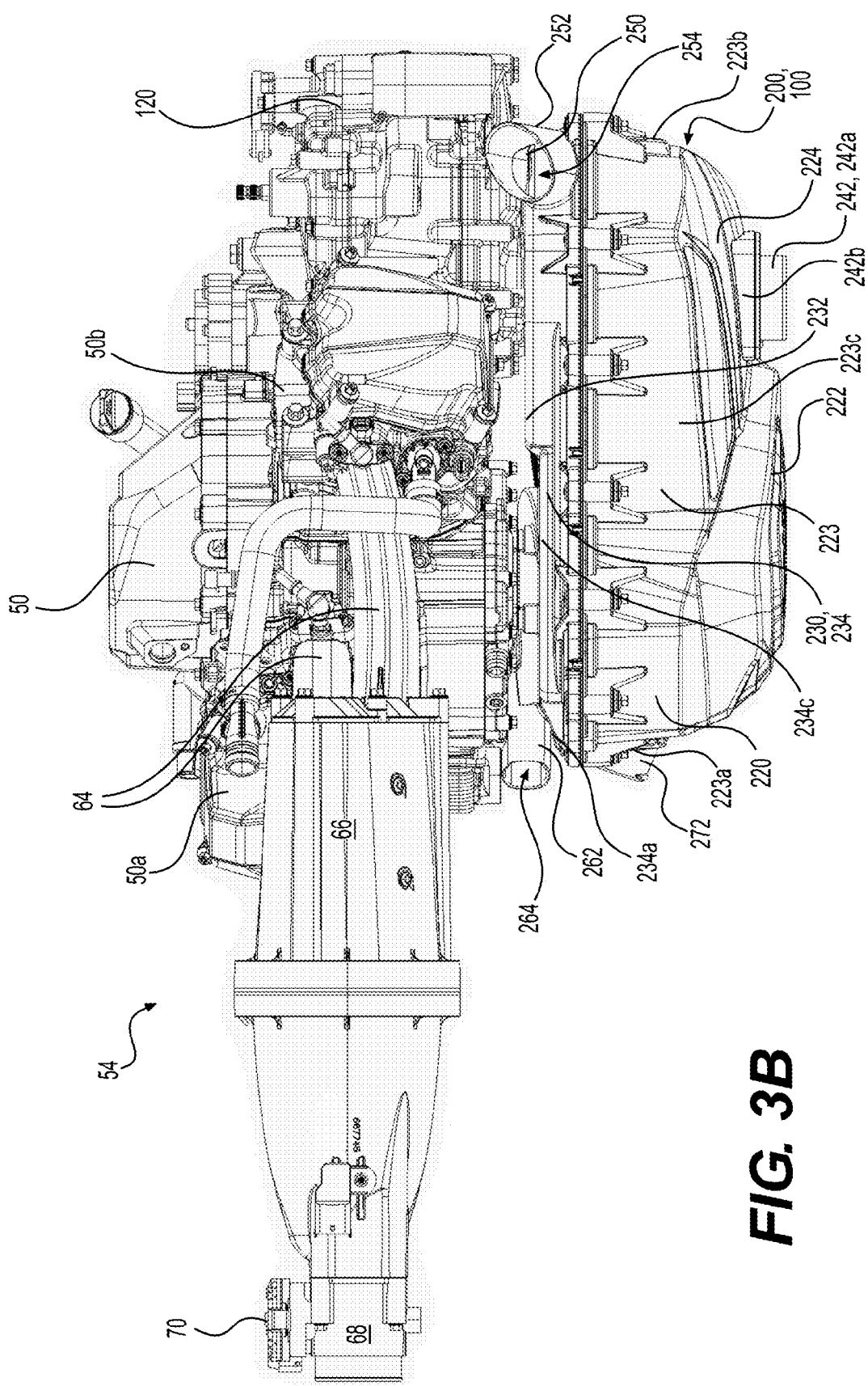
FIG. 3B is a top plan view of the portion of the powerpack portion of FIG. 3A.

The front and rear wheels 14A, 14B are connected to a motor 50 (FIG. 3A) via a powertrain 52. In the illustrated implementation, the motor 50 is an internal combustion engine, but it is contemplated that the motor 50 could be other than an internal combustion engine, for example, and electric motor or a hybrid. The engine 50 is mounted to the frame 12 and has a portion disposed between the right seats 19A, 19B and the left seats 17A, 17B. A console 18 positioned between the right seats 19A, 19B and the left seats 17A, 17B covers the engine 50. The console defines in part a central cooling tunnel allowing air to flow from the front end of the vehicle 10 to the rear end of the vehicle 10 to cool the engine 50 and other components of the vehicle 10.

The engine 50 is a four-stroke V-twin engine. Accordingly, the engine 50 has two cylinders 50A, 50B extending at an angle from each other. It is contemplated that other types of engines could be used. For example, the engine 50 could be a two-stroke engine with in-line cylinders. It is also contemplated that the engine 50 could have more than two cylinders 50A, 50B, or only one cylinder. Each cylinder 50A, 50B has an intake port (not shown) connected to an air induction system 54. A fuel injector (not shown) injects fuel into the engine 50 and a spark plug (not shown) ignites the fuel-air mixture to initiate the combustion cycle. Each cylinder 50A, 50B has an exhaust port (not shown) connected to an exhaust manifold (not shown) to remove exhaust gases resulting from the combustion process from the engine 50. Exhaust gases flow out of the exhaust manifold and outside the vehicle 10 via an exhaust system including a muffler 58.

The air induction system 54 includes an intake manifold 64, a plenum chamber 66 connected upstream of the intake manifold 64 and a throttle body 68 connected upstream of the plenum chamber 66. When the engine 50 is operating, air flows sequentially through the throttle body 68, the plenum chamber 66, the intake manifold 64 and then through the intake ports into the cylinders 50A, 50B of the engine 50. The intake manifold 64 separates the flow of air from the plenum chamber 66 into two branches, each of the branches being connected to an air intake port of a corresponding cylinder 50A, 50B of the engine 50. The plenum chamber 66 equalizes the pressure of air entering the cylinders and also acts as an acoustic silencer to dampen the noise generated by the engine 50. The throttle body 68 regulates the flow of air to the engine 50 by adjusting the position of a throttle plate (not shown) disposed inside the throttle body 68. An electric motor 70 mounted to a right side of the throttle body 68 controls the throttle plate inside the throttle body 68 for regulating airflow therethrough into the engine 50.

The engine 50 has a crankshaft (not shown) extending horizontally and laterally. The crankshaft is operatively connected, via the powertrain 52, to the two front wheels 14A as well as the two rear wheels 14B to propel the vehicle 10. It is contemplated that the engine 50 could be operatively connected only to the front wheels 14A or only to the rear wheels 14B.

Figure 2A:
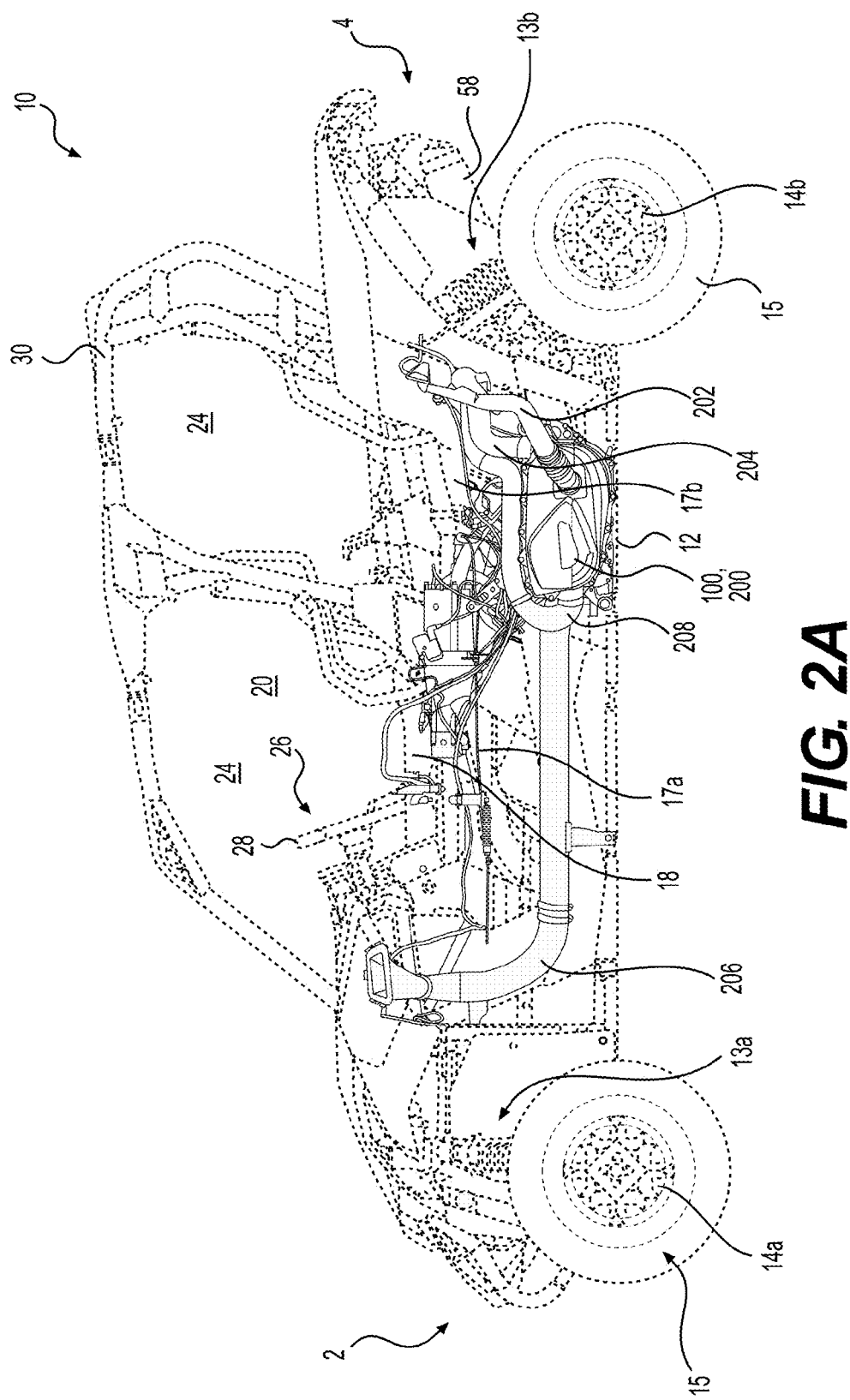
FIG. 2A is a left side elevation view of the vehicle (shown in dotted lines) of FIG. 1A with a continuously variable transmission (CVT) assembly.
Figure 2B:
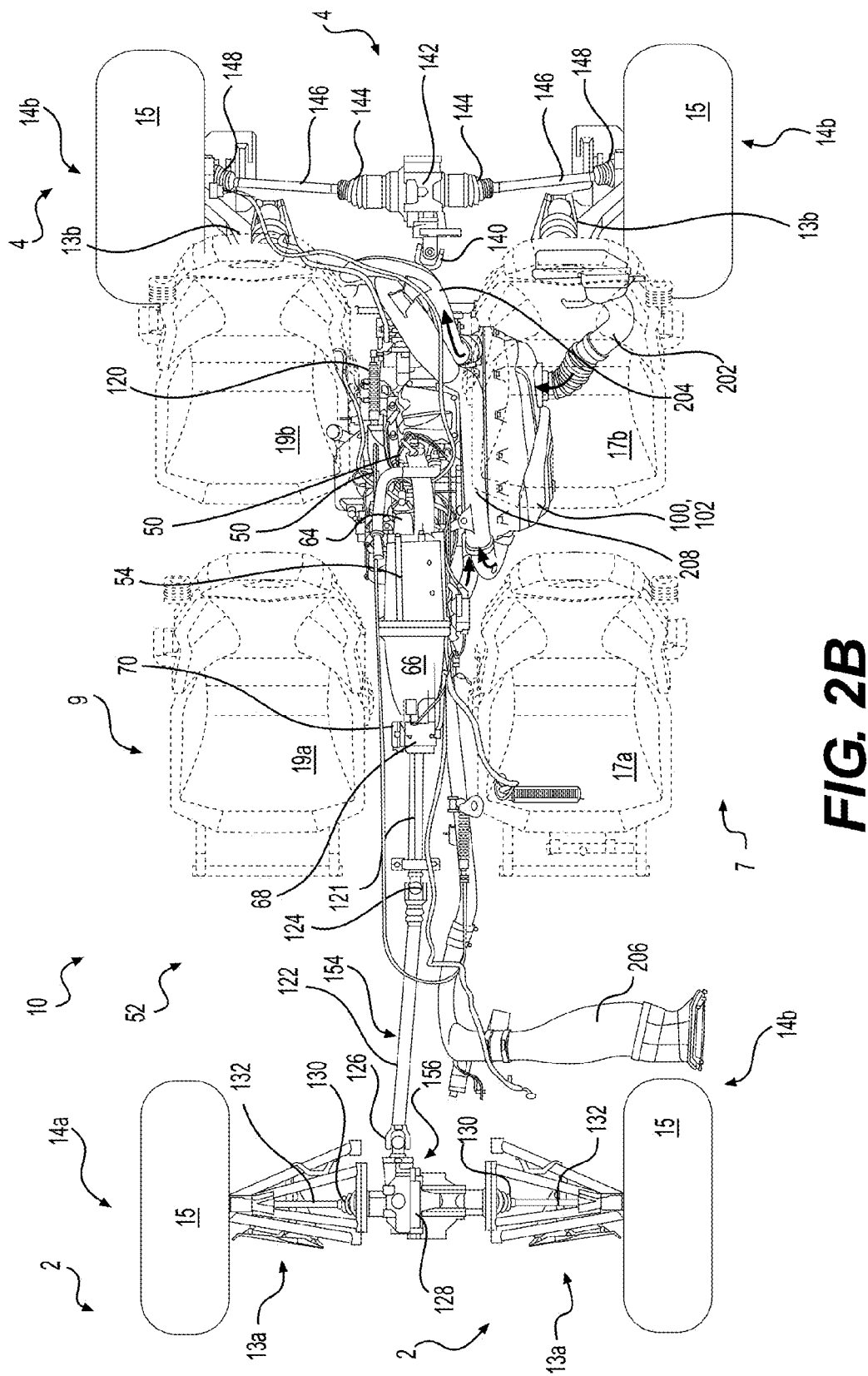
FIG. 2B is a top plan view of the CVT assembly, the powerpack, the drivetrain, the wheels and the seats of the vehicle of FIG. 1A.

With reference to FIG. 2B, the powertrain 52 includes a continuously variably transmission (CVT) 102 and a transmission 120.

Figure 3C:
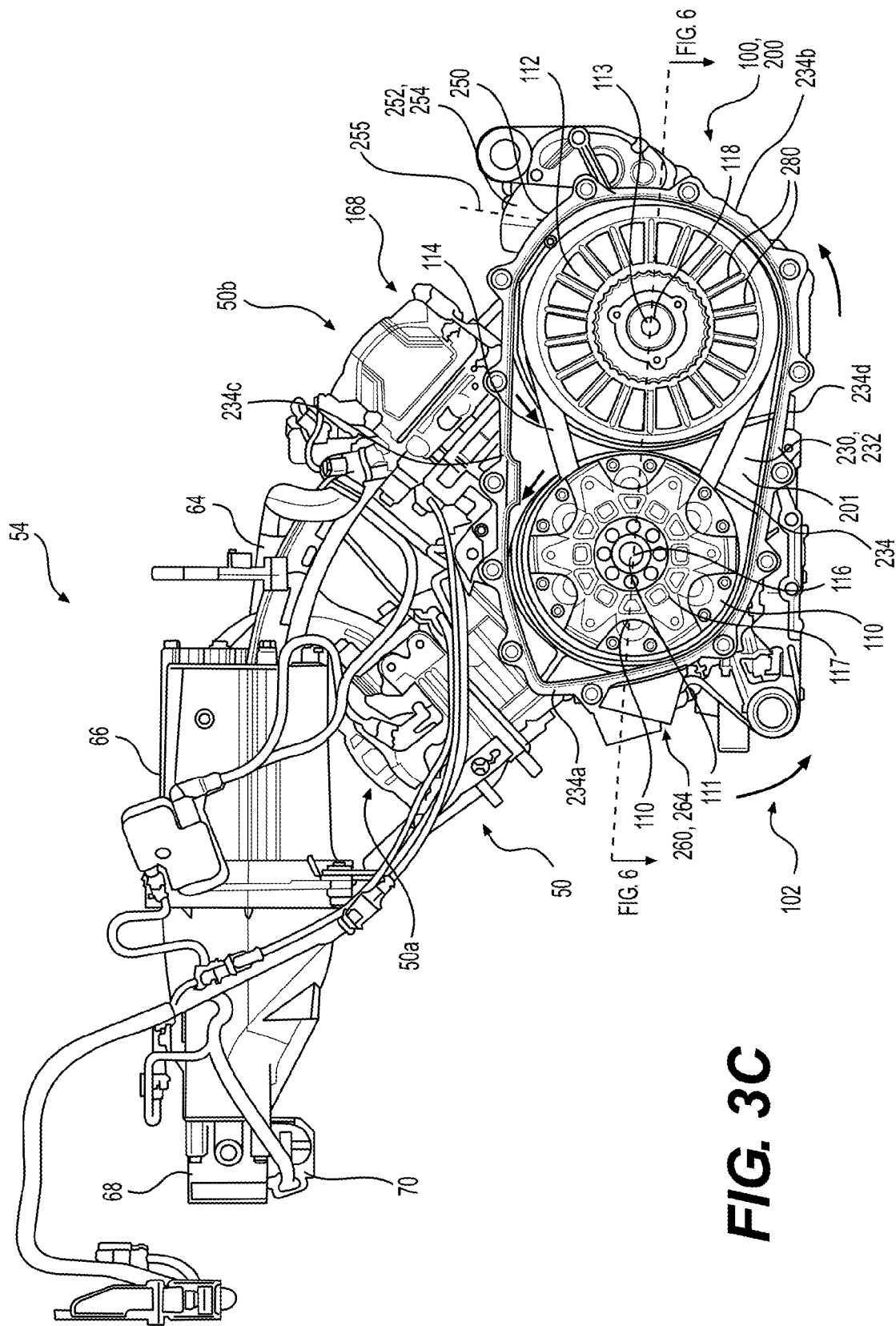
FIG. 3C is a left side elevation view of a portion of the powerpack with a left side cover of the CVT assembly removed to show the CVT of the CVT assembly.

The CVT 102 is disposed on a left side of the engine 50. With reference to FIG. 3C, the CVT 102 includes a driving pulley 110 mounted on a driving pulley shaft 116 connected to the crankshaft for rotation therewith, a driven pulley 112 disposed on a driven pulley shaft 118 for rotation therewith, and a CVT belt 114 disposed around both pulleys 110, 112 to transmit torque from the driving pulley 110 to the driven pulley 112. In the illustrated implementation, the driving pulley shaft 116 is coaxial with and connected to the engine crankshaft, but it is contemplated that the driving pulley shaft 116 could be the engine crankshaft. It is also contemplated that the driving pulley shaft 116 could not be coaxial with the engine crankshaft. The driving pulley 110, the driving pulley shaft 116, and the engine crankshaft rotate about a driving pulley axis 111. The driven pulley 112 and the driven pulley shaft 118 rotate about a driven pulley axis 113 that is parallel to the driving pulley axis 111. A belt reference plane 115 (best seen in FIG. 6) is defined by the center of the belt 114. The belt reference plane 115 is equidistant from the left and right edges of the belt 114. Each of the pulleys 110, 112 includes a movable sheave that can move axially relative to a fixed sheave to modify an effective diameter of the corresponding pulley 110, 112. The moveable sheaves move in response to changes in engine speed and torque requirement of the wheels 14A, 14B. The effective diameters of the pulleys 110, 112 are in inverse relationship. The effective diameter of the driving pulley 110 generally increases with its rotation speed (rotations per minute, or RPM). In the illustrated implementation, the moveable sheave of the driving pulley 110 is disposed on the left side of the belt 114 while the moveable sheave of the driven pulley 112 is disposed on the right side of the belt 114. A centrifugal clutch system 117 is disposed on the left side of the driving pulley 110 and is connected to its moveable sheave for changing the diameter of the driving pulley 110 in response to the rotational speed of the driving pulley shaft 116. In the illustrated implementation, the CVT 102 is a purely mechanical CVT 102, in which the diameter of the driving pulley 110 generally increases with increasing rotational speed of the driving pulley 110 (i.e. with increasing engine speed). It is also contemplated that the CVT 102 could be an assisted CVT having a hydraulic, pneumatic, or other system to control the effective diameter of the pulleys 110 or 112.

In the illustrated implementation of the CVT 102, when the driving pulley diameter increases, its moveable (left) sheave moves rightwardly towards the fixed (right) sheave, resulting in the moveable (right) sheave of the driven pulley 112 moving rightwardly away from its fixed (left) sheave to decrease the diameter of the driven pulley 112. The belt 114 and the belt reference plane 115 thus move rightwardly when the driving pulley diameter increases, for example, in response to an increase in torque required at the driven shaft 118. The reverse happens when the diameter of the driving pulley 110 decreases. It is contemplated that the position of the fixed and moveable sheaves could be other than that shown herein. It is also contemplated that both sheaves of the driving pulley 110, and/or the driven pulley could be moveable.

In the illustrated implementation of the CVT 102, when viewed from a left side, as in FIG. 3C, the driving pulley 110 and the driven pulley 112 rotate in a counterclockwise direction. It is however contemplated that the rotation of the pulley 110, 112 could be in the opposite direction.

The CVT 102 is enclosed in a CVT housing 200 which will be described below in further detail. The CVT 102 and the CVT housing 200 are part of a CVT assembly 100.

The transmission 120 is disposed rearwardly of the engine 50. The transmission 120 transfers torque from the transversely extending driven pulley shaft 118 to a longitudinally extending front driveshaft 121 and a longitudinally extending rear driveshaft (not shown). The transmission 120 includes different gear sets, the combination of the gear sets being selected based on the position of a gear selector 40 provided near the steering wheel 28.

The front driveshaft 121 passes through the engine 50 and connects to a secondary front driveshaft 122 via a universal joint 124. From the universal joint 124, the secondary front driveshaft 122 extends forwardly and toward the right of the vehicle 10 to another universal joint 126. The universal joint 126 connects the secondary front driveshaft 122 to a differential 128. The differential 128 connects, via universal joints 130, to left and right drive axles 132. Each drive axle 132 is connected to a corresponding one of the front wheels 14A via a universal joint (not shown).

The rear driveshaft connects via a universal joint 140 to a differential 142. The differential 142 connects, via universal joints 144, to left and right drive axles 146. Each drive axle 146 is connected to a corresponding one of the rear wheel 14B via universal joint 148.

The vehicle 10 has other features and components such as headlights and handles. As it is believed that these features and components would be readily recognized by one of ordinary skill in the art, further explanation and description of these components will not be provided herein.

The CVT assembly 100 will now be described in detail with reference to FIGS. 2A to 7B. The CVT assembly 100 includes a CVT housing 200 defining a space 201 and the CVT 102 disposed in the space 201. The driving pulley 110 is disposed in the front portion of the space 201, and the driven pulley 112 is disposed in the rear portion thereof. The CVT assembly 100 also includes air ducts 202, 204, 206, 208 connected to the housing 200.

The CVT housing 200 includes a left cover 220 disposed to the left of the CVT 102, and a right cover 230 disposed to the right of the CVT 102. The left and right covers 220, 230 are connected together to define the space 201 therebetween. The right cover 230 is disposed on a left side of the engine 50 and the transmission 120, and connected thereto. Openings 240, 250, 260 and 270 are defined in the CVT housing 200.

The left cover has a front side portion 222 extending on a left side of the driving pulley 110, and a rear side portion 224 extending rearwards from the front portion 222 on a left side of the driven pulley 112. The left cover 220 has a rim portion 223 that extends rightwardly from the front and rear side portions 222, 224. A front rim portion 223a extends generally vertically and is disposed longitudinally forward of the CVT 102. A rear rim portion 223b extends generally vertically and is disposed longitudinally rearward of the CVT 102. An upper rim portion 223c extends generally horizontally and is disposed vertically higher than the CVT 102. A lower rim portion 223d extends generally horizontally and is disposed vertically lower than the CVT 102. As can be seen in FIG. 6, the belt reference plane 115 passes through the left cover 220, specifically the rim portion 223 of the left cover 220. Through-holes 221 are defined at the edge of the rim portion 223 as can be seen in FIGS. 5A to 5B for connecting the left cover 220 to the right cover 230.

Ribs 286 are formed on the inner surface (surface facing the CVT 102) of the left cover 220. The ribs 286 are disposed between the driving pulley 110 and the driven pulley 112. The ribs 286 provide structural reinforcement to the left cover 220 and also help to direct airflow within the space 201 as will be described below.

The opening 240 is defined in the rear portion 224 of the left cover 220. The opening 240 is generally circular in shape and coaxial with the driven pulley axis as can be seen best in FIG. 6. The left sheave of the driven pulley 112, which in the illustrated implementation is the fixed sheave of the driven pulley 112, faces leftward towards the opening 240. The left sheave has fins 280 formed on its outer surface, i.e. the surface facing away from the belt 114 towards the opening 240. When the driven pulley 112 rotates, the rotating fins 280 act as a fan drawing air via the opening 240 into the space 201 enclosed by the housing 200. The opening 240 is therefore referred to as the driven pulley inlet 240 hereinafter. In general, the amount of air drawn into the space 201 increases as the driven pulley 112 rotates faster. As the rotational speed (rpm) of the driven pulley 112 is generally proportional to the vehicle speed, the amount of air being drawn into the space 201 via the inlet 240 also increases with the vehicle speed.

Figure 5A:
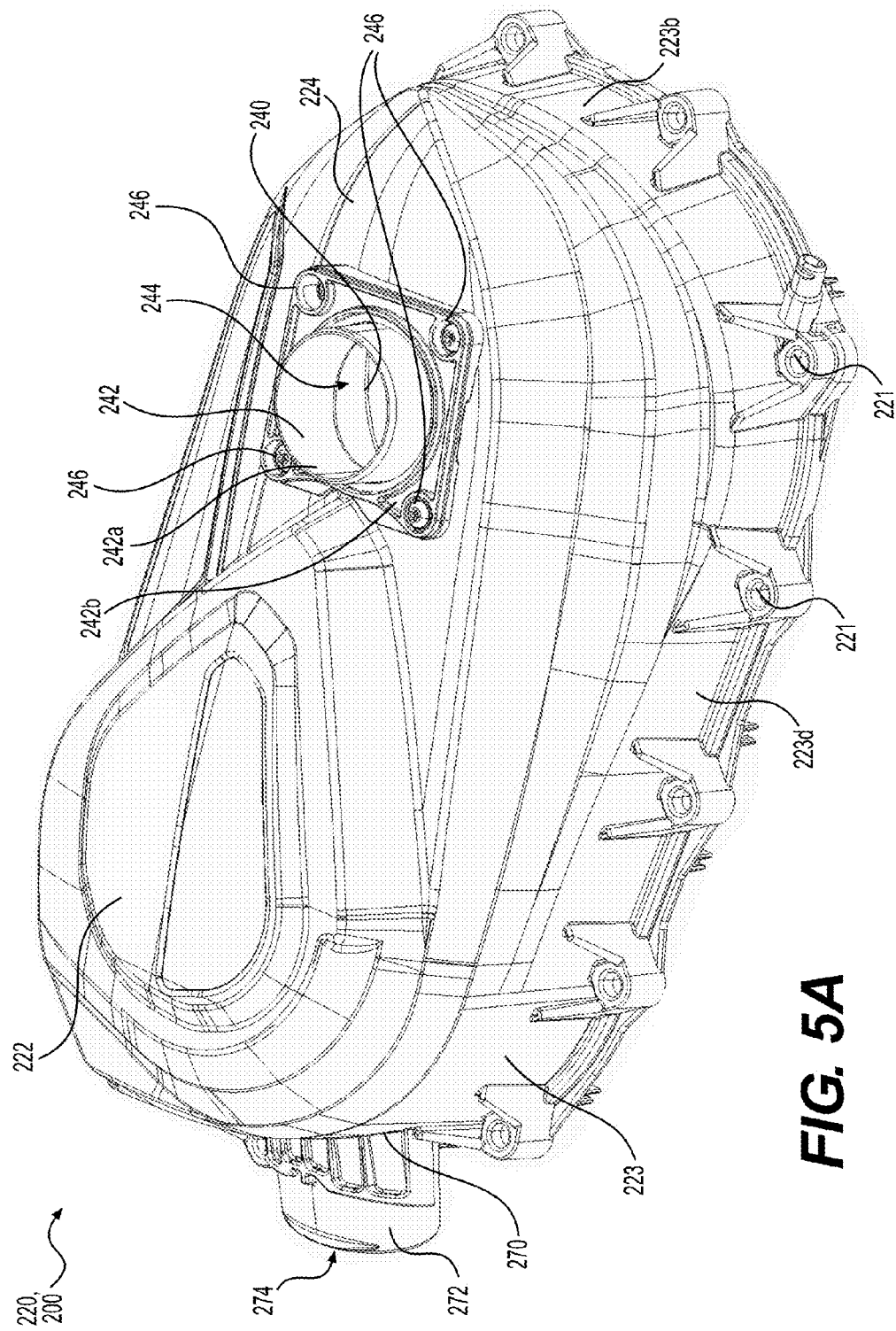
FIG. 5A is a perspective view, taken from a bottom, rear and left side, of the left cover of the CVT assembly of FIG. 4.
Figure 5B:
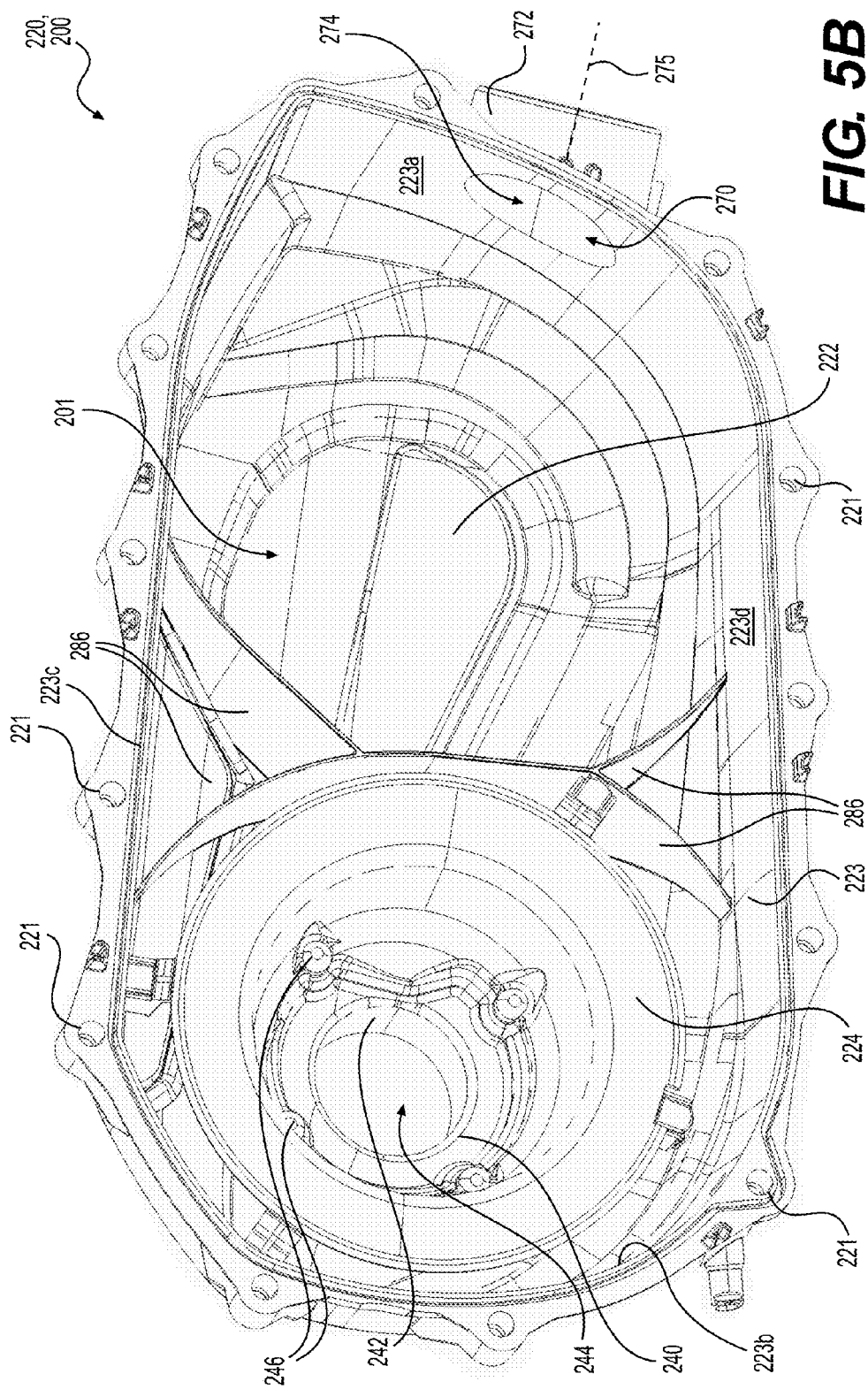
FIG. 5B is a perspective view, taken from a top, rear and right side, of the left cover of FIG. 5A.
Figure 6:
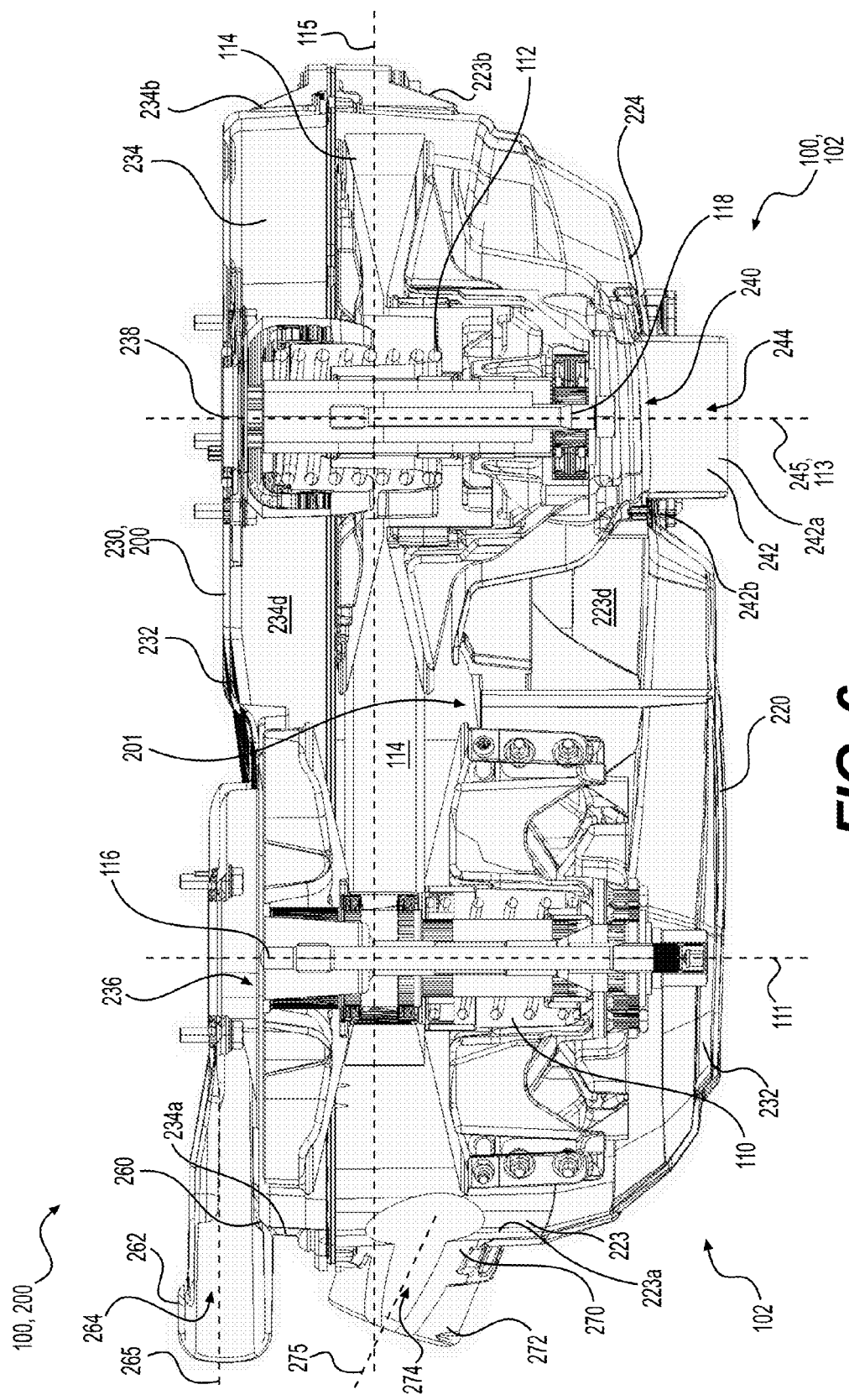
FIG. 6 is a cross-sectional view, taken along the line 6-6 of FIG. 3C, of the CVT assembly of FIG. 4.
Figure 7A:
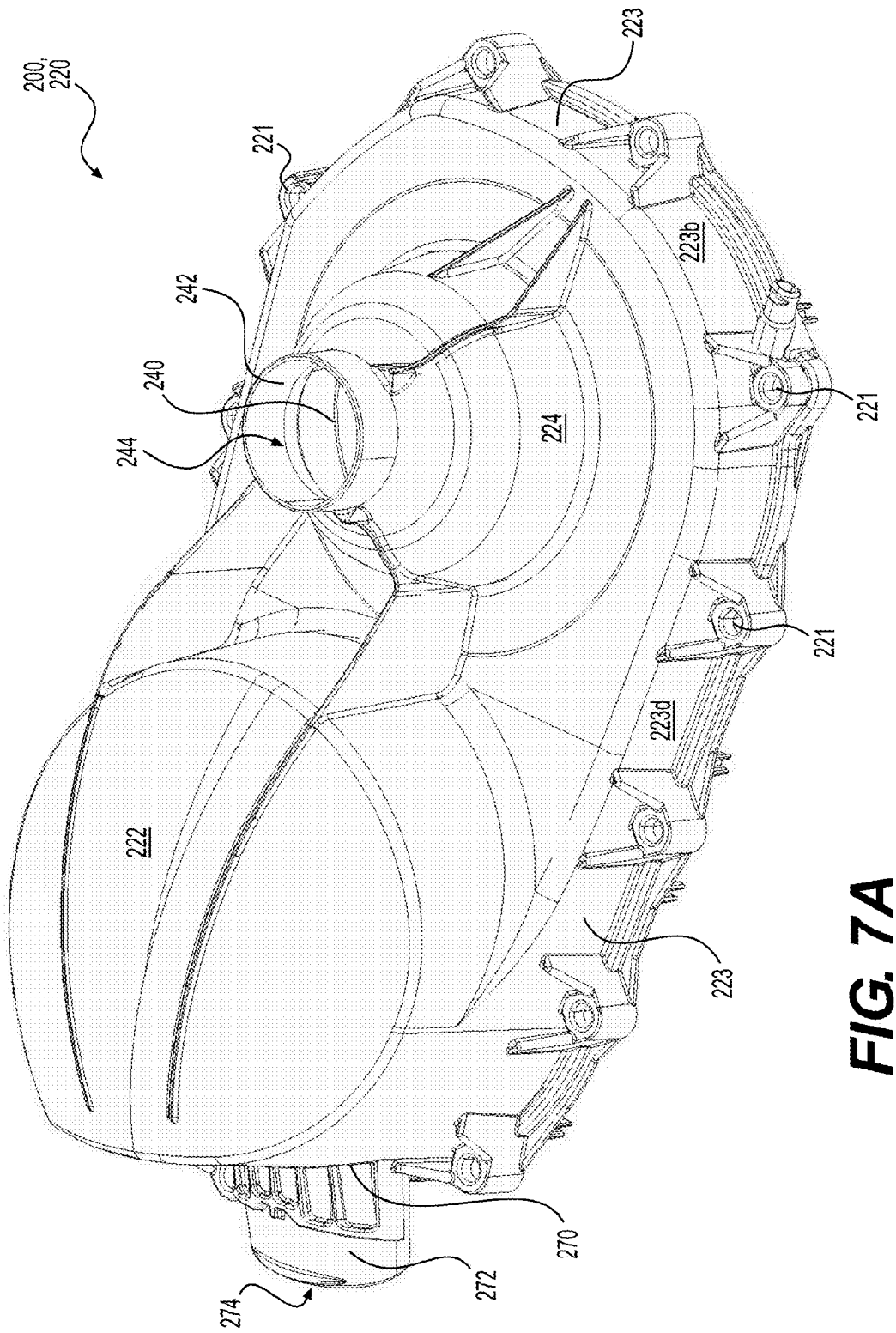
FIG. 7A is a perspective view, taken from a bottom, rear and left side, of another implementation of a left cover of the CVT assembly of FIG. 4.
Figure 7B:
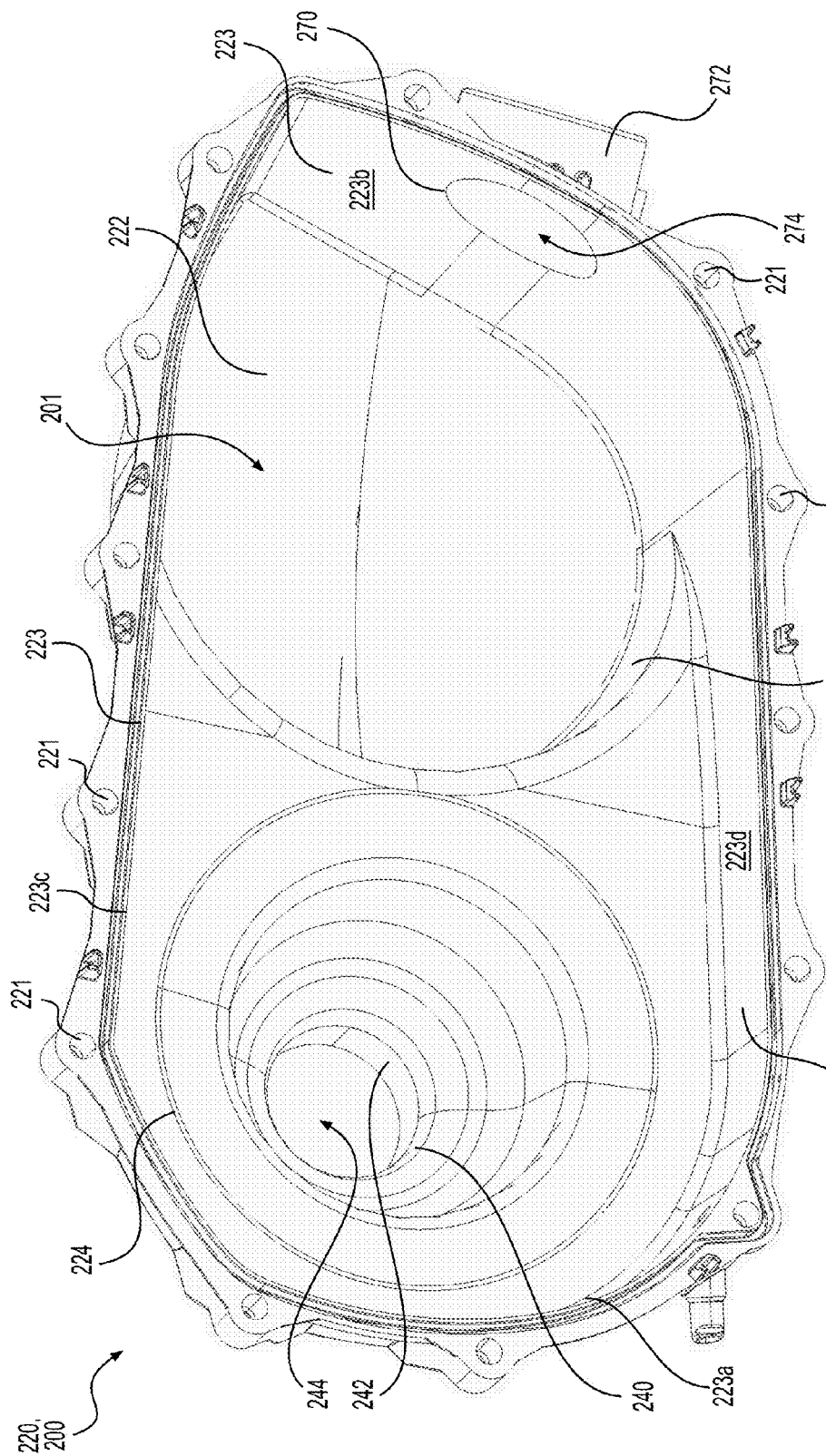
FIG. 7B is a perspective view, taken from a top, rear and right side, of the left cover of FIG. 7A.

In the implementation of FIGS. 5A to 5B, an inlet pipe flange 242 is connected to the housing 200 around the inlet 240. The inlet pipe flange 242 has a pipe portion 242a that defines an inlet passage 244 that fluidly connects to the inlet 240 and also provides a surface for attachment of the air duct 202. In the illustrated implementation, the inlet passage 244 has a circular cross-section and has similar dimensions as the inlet 240. The inlet passage 244 is disposed coaxially with the driven pulley axis 113. The pipe portion 242a of the inlet pipe flange 242 is connected at one end to a flange portion 242b that extends outwardly away from the passage 244. The flange portion 242b is connected to the left cover 220 by bolts 246 inserted through through-holes defined in the flange portion 242b and aligned with corresponding through-holes of the left cover 220. In the implementation of FIGS. 7A to 7B, the inlet pipe flange 242 is formed integrally with the left cover 220. As the driven pulley 112 rotates about the driven pulley axis 113, air from outside the housing 200 is drawn through the inlet passage 244 and the inlet 240 into the space 201. The air flowing into the space 201 thus flows in an axial direction of the driven pulley 112 and toward the driven pulley 112 to cool the driven pulley 112 and the belt 114.

The opening 270 is defined in the front rim portion 223a. The opening 270 is disposed longitudinally forward of the driving pulley 110, and thus closer to the driving pulley 110 than the driven pulley 112. The opening 270 is generally elliptical in cross-section. The opening 270 is connected to a pipe 272 which is formed integrally with the left cover rim portion 223. The pipe 272 defines a passage 274 fluidly communicating with the opening 270 and having a central axis 275. The air duct 208 is connected to the pipe 262. The passage 274 has a generally elliptical cross-section. The central axis 275 (FIG. 5B) of the passage 274 extends forwardly and rightwardly from the opening 270 as best seen in FIG. 6. As can be seen in FIG. 6, the belt reference plane 115 passes through the opening 270 and the passage 274. The central axis 275 is disposed in a direction generally perpendicular to the driving pulley axis 111.

Figure 4:
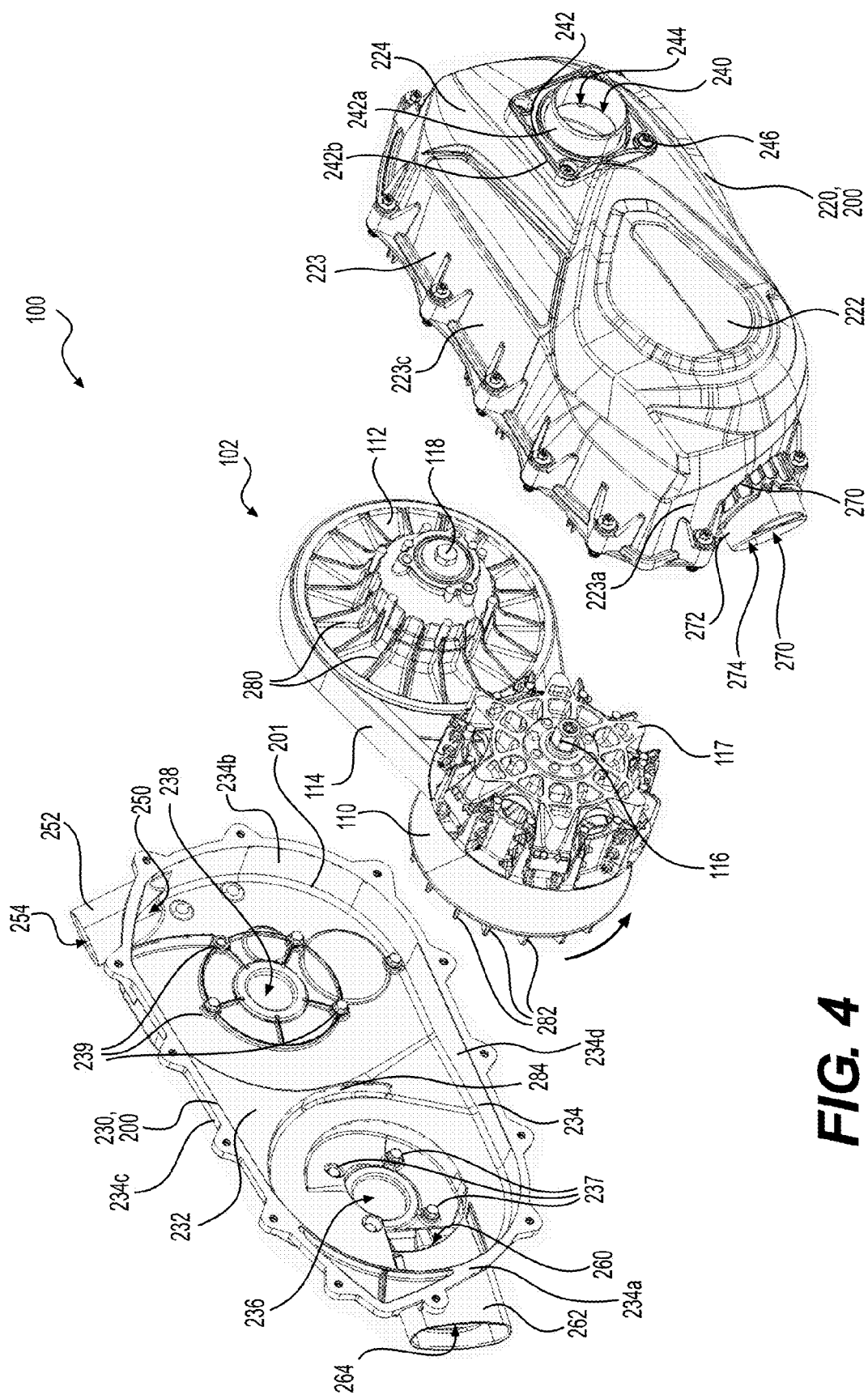
FIG. 4 is a partially exploded perspective view, taken from a front, left side, of the CVT assembly of FIG. 3A with the air ducts removed for clarity.
Figure 5C:
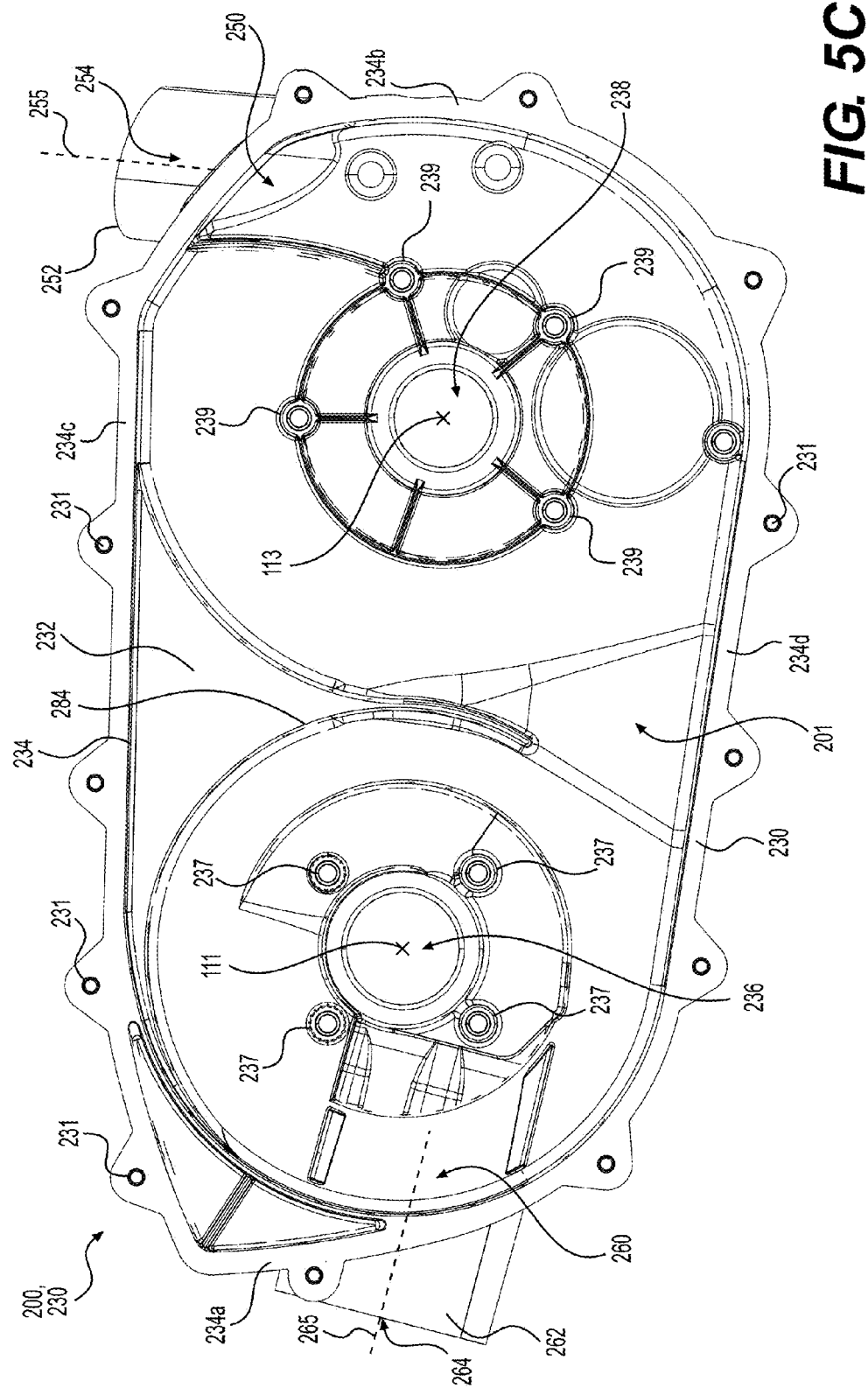
FIG. 5C is a left side elevation view of a right cover of the CVT assembly of FIG. 4.

Turning now to FIGS. 4, 5C and 6, the right cover 230 has a portion 232 extending vertically on a right side of the CVT 102. A rim portion 234 of the right cover 230 extends laterally inwardly (leftwardly) from the edges of the portion 232 around the CVT 102. A front rim portion 234a extends generally vertically and is disposed longitudinally forward of the driving pulley 110. A rear rim portion 234b extends generally vertically and is disposed longitudinally rearward of the driven pulley 112. An upper rim portion 234c disposed vertically higher than the CVT 102 extends generally horizontally and a lower rim portion 234d disposed vertically lower than the CVT 102 extends generally horizontally. In the illustrated implementation, the right cover 230 is entirely disposed on a right side of the belt reference plane 115. It is however contemplated that the belt reference plane 115 could pass through the right cover rim portion 234 instead of the left cover rim portion 223, or could pass through both.

Ribs 284 are formed on the inner surface (surface facing the CVT 102) of the right cover 230. The ribs 284 are disposed between the driving pulley 110 and the driven pulley 112. The ribs 284 provide structural reinforcement to the right cover 230 and also help to direct airflow within the space 201 as will be described below.

A driving shaft opening 236 extends through the vertical portion 232 of the right cover 230. The driving pulley shaft 116 extends from the crankshaft of the engine 50 disposed on a right side of the right cover 230, through the opening 236, to connect to the driving pulley 110 disposed on the left side of the right cover 230. The driving shaft opening 236 is surrounded by a boss. Through-holes 237 are defined through the boss. Bolts are inserted through the holes 237 into the casing of the engine 50 to connect the right cover 230 to the engine 50.

Similarly, a driven shaft opening 238 extends through the vertical portion 232 of the right cover 230. The driven shaft opening 238 is disposed longitudinally rearward of the driving shaft opening 236 and receives the driven pulley shaft 118 extending therethrough. A right end of the driven pulley shaft 118 is connected to the transmission 116 disposed on the right side of the right cover 230, and the driven pulley 112 is mounted on the left end of the driven pulley shaft 118 disposed inside the space 201. The driven shaft opening 238 is surrounded by a boss. Through-holes 239 are defined through the boss. Bolts are inserted through the holes 239 into the casing of the transmission 120 to connect the right cover 230 to the transmission.

Through-holes 231 are defined at the edge of the rim portion 234 as best seen in FIG. 5C. The through-holes 231 are aligned with the through-holes 221 of the left cover rim portion 223. Bolts are inserted through the aligned holes 221, 231 to connect the left cover 220 to the right cover 230.

The opening 250 is defined in the rear rim portion 234b just below the upper rim portion 234c. The opening 250 is thus closer to the driven pulley 112 than the driving pulley 110. The opening 250 is disposed vertically higher than the driven shaft opening 238. The opening 250 has an elliptical shape. A pipe 252 is connected to the opening 250 and defines a passage 254 having a central axis 255. The air duct 204 is connected to the pipe 252. In the illustrated implementation, the pipe 252 is formed integrally with the rim portion 234, but it is contemplated that the pipe could be formed as a separate piece and attached to the rim portion 234. As can be seen in FIG. 5C, the central axis 255 of the passage 254 is disposed in a direction generally tangential to the driven pulley 112. It is contemplated that the central axis 255 could be disposed in a direction generally perpendicular to the driven pulley axis 113 without being tangential to the driven pulley 112. It is contemplated that the central axis 255 could be disposed in a direction other than perpendicular to the driven pulley axis 113.

The opening 260 is defined in the front portion of the right cover front rim portion 234a. The opening 260 is thus closer to the driving pulley 110 than the driven pulley 112. The opening 260 is disposed longitudinally forward of the driving shaft opening 236. A portion of the opening 260 extends vertically lower than the driving shaft opening 236. The opening 260 has an elliptical shape. A pipe 262 is connected to the opening 260 and defines a passage 264 having a central axis 265. In the illustrated implementation, the pipe 262 is formed integrally with the rim portion 234, but it is contemplated that the pipe could be formed as a separate piece and attached to the rim portion 234. The duct 206 is connected to the pipe 262. As can be seen in FIG. 5C, the central axis 265 of the passage 264 extends upwardly and forwardly away from the opening 260. As can be seen from FIG. 6, the central axis 265 is disposed generally parallel to the belt reference plane 115 and perpendicular to the driving pulley axis 111 when viewed from the top. It is contemplated that the central axis 265 could be disposed tangentially with respect to the driving pulley 110. The right (fixed) sheave of the driving pulley 110 has fins 282 (FIG. 4) formed on its outer surface, i.e. the surface facing away from the belt 114. When the driving pulley 110 rotates in a counter-clockwise direction (as viewed from a left side), the rotating fins 282 act as a fan drawing air via the opening 260 into the space 201 enclosed by the housing 200.

As mentioned above, the counter-clockwise rotation (when viewed from a left side of the CVT 102) of the driven pulley 112 draws air from outside the housing 200 into the space 201 toward the driven pulley 112. As can be seen in FIGS. 2A and 2B, the air duct 202 connected to the inlet pipe 242 extends leftward therefrom and then upward to draw air in from a left side 7 of the vehicle 10. The opening of the air duct 202 is covered with a mesh and provided with a filter to prevent entry of large debris.

The counter-clockwise rotation of the driven pulley 112 also pushes air inside the space 201 out through the opening 250. As such, the opening 250 is referred to hereinafter as the driven pulley outlet 250, the pipe 252 is referred to hereinafter as the driven pulley outlet pipe 252, the passage 254 is referred to hereinafter as the driven pulley outlet passage 254, and the central axis 255 is referred to hereinafter as the driven pulley outlet axis 255. As can be seen in FIGS. 2A and 2B, the air duct 204 connected to the outlet pipe 252 extends upwardly therefrom, then rearwardly, and then rightwardly below the rear right seat 19B to its outlet (not shown) which expels air to a right side 9 of the vehicle 10. The opening of the air duct 204 is covered with a mesh to prevent entry of large debris.

The counter-clockwise rotation (when viewed from a left side of the CVT 102) of the driving pulley 110 tends to draw air from outside the housing 200 into the space 201 via the passage 264 and the opening 260. As such, the opening 260 is referred to hereinafter as the driving pulley inlet 260, the pipe 262 is referred to hereinafter as the driving pulley inlet pipe 262, the passage 264 is referred to hereinafter as the driving pulley inlet passage 264, and the central axis 265 is referred to hereinafter as the driving pulley inlet axis 265. As can be seen in FIGS. 2A and 2B, the air duct 206 connected to the inlet pipe 262 extends forwardly therefrom below the cockpit floor 21, then upwardly in front of the front wall 23, and finally leftwardly to draw air in from a left side 7 of the vehicle 10. The opening of the air duct 206 is covered with a mesh and provided with a filter to prevent entry of large debris.

The counter-clockwise of the driving pulley 110 also pushes air inside the space 201 outside the housing 200 via the opening 270 and the passage 274. As such, the opening 270 is referred to hereinafter as a driving pulley outlet 270, the pipe 272 is referred to hereinafter as the driving pulley outlet pipe 262, the passage 274 is referred to hereinafter as the driving pulley outlet passage 274, and the central axis 175 is referred to hereinafter as the driving pulley outlet axis 275. As can be seen in FIGS. 2A and 2B, the air duct 208 connected to the outlet pipe 272 extends forwardly and upwardly therefrom, then rearwardly above the CVT housing 200, then upwardly rightwardly below the rear right seat 19B to its outlet (not shown) which expels air to a right side 9 of the vehicle 10. The opening of the air duct 208 is covered with a mesh to prevent entry of large debris.

Thus, cool air flows into the space 201 via the inlets 240, 260. After cooling the CVT 102, including the pulleys 110, 112 and the belt 114, heated air flows out of the space 201 via the outlets 250, 270. Air flowing in through the driven pulley inlet 240 cools the driven pulley 112 and thereby the belt 114. Air flowing in through the driving pulley inlet 260 cools the driving pulley 110 and thereby the belt 114.

The ribs 284 formed on the inner surfaces of the right cover 230 help to direct part of the air flowing in through the driving pulley inlet 260 leftward towards the driving pulley 110 instead of flowing rearwardly and out via the driven pulley outlet 250. Similarly the ribs 284 formed on the inner surface of the left cover 220, help to prevent some of the air flowing in through the driven pulley inlet 240 from flowing out through the driving pulley outlet 270.

In the illustrated implementation, the housing 200 is made of plastic, and formed by molding. It is however contemplated that the housing 200 could be formed of any suitable material and/or process.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A continuously variable transmission (CVT) assembly comprising:
    a driving pulley rotatable about a driving pulley axis;
    a driven pulley rotatable about a driven pulley axis disposed parallel to the driving pulley axis;
    an endless belt operatively connecting the driving pulley with the driven pulley, the belt defining a belt reference plane, the driving pulley axis and the driven pulley axis passing through the belt reference plane;
    a housing enclosing a space, the driving pulley, the driven pulley, and the belt being disposed at least in part in the space;
    a driven pulley inlet defined in the housing and disposed on a first side of the belt reference plane, the driven pulley inlet being disposed closer to the driven pulley than to the driving pulley, the driven pulley axis passing through the driven pulley inlet, the driven pulley inlet being configured to direct air from outside the housing into the space toward the driven pulley; and
    a driven pulley outlet defined in the housing and disposed on a second side of the belt reference plane, the driven pulley outlet being disposed closer to the driven pulley than the driving pulley, air flowing from the space to the outside of the housing via the driven pulley outlet.

2. The CVT assembly of claim 1, wherein the driven pulley inlet is configured to direct air into the space in an axial direction with respect to the driven pulley.

3. The CVT assembly of claim 1, wherein the driven pulley outlet is disposed radially outwardly of the driven pulley axis.

4. The CVT assembly of claim 3, wherein at least a portion of the driven pulley outlet is disposed radially outwardly of the driven pulley.

5. The CVT assembly of claim 4, wherein the driven pulley outlet is configured to direct air flowing therethrough in a direction generally perpendicular to the driven pulley axis.

6. The CVT assembly of claim 1, wherein the driven pulley comprises an outer surface disposed on the first side of the belt reference plane and facing away from the belt, the outer surface of the driven pulley comprising fins, rotation of the driven pulley causing air from outside the space to be drawn into the space via the driven pulley inlet.

7. The CVT assembly of claim 1, further comprising:
    a driving pulley inlet defined in the housing and disposed closer to the driving pulley than the driven pulley, the driving pulley inlet being configured to direct air from outside the housing into the space and toward the driving pulley.

8. The CVT assembly of claim 7, wherein the driving pulley inlet is disposed at least in part on the second side of the belt reference plane.

9. The CVT assembly of claim 8, wherein the driving pulley comprises an outer surface disposed on the second side of the belt reference plane and facing away from the belt, the outer surface of the driving pulley comprising fins, rotation of the driving pulley causing air from outside the space to be drawn into the space via the driving pulley inlet.

10. The CVT assembly of claim 7, wherein the driving pulley inlet is configured to direct air into the space in a direction generally perpendicular to the driving pulley axis.

11. The CVT assembly of claim 7, further comprising:
    a driving pulley outlet defined in the housing and disposed closer to the driving pulley than the driven pulley, the driving pulley outlet being configured to direct air from the space to outside the housing.

12. The CVT assembly of claim 1, wherein the housing comprises:
    a first cover extending at least in part on the first side of the belt reference plane, the driving pulley and the driven pulley, the driven pulley inlet being defined in the first cover; and
    a second cover extending at least in part on the second side of the belt reference plane, the driving pulley and the driven pulley, the second cover being connected to the first cover to define the space therebetween.

13. The CVT assembly of claim 12, wherein the driven pulley outlet is defined in the second cover.

14. The CVT assembly of claim 1, further comprising a driving shaft, the driving pulley being mounted on the driving shaft to rotate therewith about the driving pulley axis, the driving shaft extending through an opening in the housing, the opening being disposed on the second side of the belt reference plane.

15. A vehicle comprising:
 a frame;
 at least one ground engaging member, each ground engaging member being one of: a ski, a track and a wheel;
 a motor; and
 a CVT assembly according to claim 1 operatively connecting the motor to the at least one ground engaging member.

16. A continuously variable transmission (CVT) assembly comprising:
 a driving pulley rotatable about a driving pulley axis;
 a driven pulley rotatable about a driven pulley axis disposed parallel to the driving pulley axis;
 an endless belt operatively connecting the driving pulley with the driven pulley, the belt defining a belt reference plane, the driving pulley axis and the driven pulley axis passing through the belt reference plane;
 a housing enclosing a space, the driving pulley, the driven pulley, and the belt being disposed at least in part in the space;
 a driven pulley inlet defined in the housing and disposed on a first side of the belt reference plane, the driven pulley inlet being disposed closer to the driven pulley than to the driving pulley, the driven pulley inlet being configured to direct air from outside the housing into the space toward the driven pulley;
 a driven pulley outlet defined in the housing and disposed on a second side of the belt reference plane, the driven pulley outlet being disposed closer to the driven pulley than the driving pulley, air flowing from the space to the outside of the housing via the driven pulley outlet;
 a driving pulley inlet defined in the housing and disposed closer to the driving pulley than the driven pulley, the driving pulley inlet being configured to direct air from outside the housing into the space and toward the driving pulley; and
 a driving pulley outlet defined in the housing and disposed closer to the driving pulley than the driven pulley, the driving pulley outlet being configured to direct air from the space to outside the housing.

17. The CVT assembly of claim 16, wherein:
 the driving pulley outlet is configured to direct air flowing therethrough in a direction generally perpendicular to the driving pulley axis.

18. The CVT assembly of claim 16, wherein:
 the driving pulley inlet is disposed at least in part on one of the first side and the second side of the belt reference plane; and
 the driving pulley outlet is disposed at least in part on an other of the first side and the second side of the belt reference plane.

19. The CVT assembly of claim 18, wherein:
 the driving pulley inlet is configured to direct air into the space and toward the driving pulley in a radial direction with respect to the driving pulley; and
 the driving pulley outlet is configured to direct air out of the space in the radial direction with respect to the driving pulley.

20. The CVT assembly of claim 18, wherein the housing comprises:
 a first cover extending at least in part on the first side of the belt reference plane, the driving pulley and the driven pulley; and
 a second cover extending at least in part on the second side of the belt reference plane, the driving pulley and the driven pulley, the second cover being connected to the first cover to define the space therebetween,
 wherein:
  one of the driving pulley inlet and the driving pulley outlet is defined in the first cover; and
 an other of the driving pulley inlet and the driving pulley outlet is defined in the second cover.

* * * * *